United States Patent [19]

Burkhardt et al.

[11] Patent Number: 5,240,894
[45] Date of Patent: Aug. 31, 1993

[54] METHOD FOR MAKING AND USING A SUPPORTED METALLOCENE CATALYST SYSTEM

[75] Inventors: Terry J. Burkhardt, Kingwood; Masahide Murata, Seabrook; William B. Brandley, Deer Park, all of Tex.

[73] Assignee: Exxon Chemical Patents Inc., Linden, N.J.

[21] Appl. No.: 885,170

[22] Filed: May 18, 1992

[51] Int. Cl.$^5$ ............................................. G08F 4/642
[52] U.S. Cl. ................................. 502/108; 502/103; 502/104; 502/107; 502/117; 526/129; 526/160
[58] Field of Search ............... 502/104, 107, 108, 117, 502/103

[56] References Cited

U.S. PATENT DOCUMENTS

| 4,659,685 | 4/1987 | Coleman, III et al. |
| 4,701,432 | 10/1987 | Welborn, Jr. |
| 4,808,561 | 2/1989 | Welborn ............................ 502/104 |
| 4,871,705 | 10/1989 | Hoel .................................. 502/117 |
| 4,912,075 | 3/1990 | Chang |
| 5,017,714 | 5/1991 | Welborn ........................ 502/117 X |
| 5,026,798 | 6/1991 | Canich |
| 5,055,436 | 12/1991 | Klemptner et al. |

FOREIGN PATENT DOCUMENTS

| 129368 | 12/1984 | European Pat. Off. |
| 279586 | 9/1988 | European Pat. Off. |
| 302424 | 2/1989 | European Pat. Off. |
| 314797 | 5/1989 | European Pat. Off. |
| 336593 | 10/1989 | European Pat. Off. |
| 354893 | 2/1990 | European Pat. Off. |
| 367503 | 6/1990 | European Pat. Off. |
| 426646 | 5/1991 | European Pat. Off. |
| 61-108 | 12/1986 | Japan |

OTHER PUBLICATIONS

Kaminaka, et al. Polymer, 1105-07, v. 33, No. 5, (1992) (month not available).

Primary Examiner—Patrick P. Garvin
Attorney, Agent, or Firm—M. Susan Spiering; Myron B. Kurtzman

[57] ABSTRACT

The invention relates to a novel process for producing a supported metallocene catalyst system useful for the polymerization and/or copolymerization of olefins, alpha-olefins, and/or diolefins which results in a catalyst product which during polymerization, produces minimal to no reactor fouling and polymer of controlled morphology. The invention is particularly useful for but not limited to polymerizing propylene or copolymerizing propylene with olefins having two or more carbon atoms. The novel support technique described herein results in a catalyst which will obtain polymer product having controlled, uniform particle size, narrow molecular weight distribution, high bulk density and depending upon the metallocene employed and monomers polymerized, stereoregularity.

7 Claims, No Drawings

METHOD FOR MAKING AND USING A SUPPORTED METALLOCENE CATALYST SYSTEM

FIELD OF THE INVENTION

The invention relates to a novel process for producing a supported metallocene catalyst system useful for the polymerization and/or copolymerization of olefins, alpha-olefins, and/or diolefins which results in a catalyst product which during polymerization, produces minimal to no reactor fouling and polymer of controlled morphology. The invention is particularly useful for but not limited to polymerizing propylene or copolymerizing propylene with olefins having two or more carbon atoms. The novel support technique described herein results in a catalyst which will obtain polymer product having controlled, uniform particle size, narrow molecular weight distribution, high bulk density and depending upon the metallocene employed and monomers polymerized, stereoregularity.

BACKGROUND

As used herein, the terms "support" and "carrier" are interchangable. Metallocene is defined as a derivative of a cyclopentadienylide (Cp), which is a metal derivative containing at least one cyclopentadienyl moiety and a transition metal. The transition metal is selected from Groups IV-B, V-B and VI-B metals, preferably IV-B and V-B metals, preferably titanium, zirconium, hafnium, chromium or vanadium; most preferable Zr, Hf and Ti. The catalyst system to be placed on a support may also contain both Cp and non-Cp transition metal groups.

Homogeneous or non-supported metallocene and organoaluminum catalyst systems are known and exploited for their high catalytic activity when employed in olefin polymerization and for their ability to produce polymers with terminal unsaturation. However, these homogeneous catalyst systems suffer from the limiting disadvantage of producing polymer which sticks to the reactor walls during the polymerization process or polymer having small particle size and low bulk density which limit their commercial utility. Typically polymer particle size and bulk density are determined by the morphological properties of the catalyst solid component [i.e., an inert carrier or support media]. Absent a solid component in the polymerization media, inferior particle size of the final polymer product results. Obtaining a useful supported catalyst for metallocene/alumoxane systems has been a problem in the past. Likewise, maintaining commercially acceptable levels of catalyst activity with minimal levels of reactor fouling occurring during polymerization, is also a problem.

Methods known in the art to obtain polymer product having uniform, compact spherical particles, narrow particle size distribution and/or high bulk density, include: (1) preactivating or precontacting the metallocene and organoaluminum (EPA 302,424, EPA 354,893), (2) prepolymerizing a heterogeneous catalyst system in the presence of at least one olefin (EPA 426,646, U.S. Pat. No. 4,871,705); (3) utilizing finally divided alumoxane to yield a powdery polymer, (EPA 279,586); and (4) utilizing a supported catalyst system and fillers in the catalyst system with affinities for polyolefins (EPA 314,797). Although meeting their objective, these techniques suffer due to either unacceptable levels of reactor fouling which occur during polymerization, low catalyst activity or producing a polymer having too small particles or broad molecular weight.

Various techniques for making supported catalyst systems known in the art include the following. Chang describes various methods for preparing heterogeneous catalyst using hydrated carriers or a wet monomer (EPA 367,503, EPA 336,593, U.S. Pat. No. 4,912,075). Chang's hydrated carrier techniques to produce a supported catalyst are limited by the amount of water added to the carrier, since that determines the amount of methylalumoxane (MAO) which can be placed on the support. The activity is acceptable for the polymerization of ethylene, but not for the polymerization of propylene monomers. Meanwhile, Japanese Kokai number SHO 61 [1986]—108,610, discloses dehydration of the support in preparation of the heterogeneous catalyst, by baking the carrier at a temperature of about 500°-800° C. It is disclosed that if the temperature rises about 800° C., sintering is induced which leads to destruction of micropores. In U.S. Pat. No. 4,659,658 Coleman et al., describe a combination of supported titanium compounds wherein one titanium component, is supported on a magnesium dichloride carrier while the other, a metallocene component, is supported on alumina. Welborn describes in U.S. Pat. No. 4,808,561 and U.S. Pat. No. 4,701,432 techniques to form a supported catalyst where the inert carrier, typically silica, is calcined, and contacted with a metallocene(s) and an activator/cocatalyst component. The metallocene and activator may be contacted simultaneously or in sequence and deposited onto the carrier to achieve the heterogeneous system. U.S. Pat. No. 4,808,561 discloses that the order of addition of metallocene and cocatalyst onto the support material can vary and is unimportant in achieving a catalytically active supported catalyst system. The preferred embodiment section of U.S. Pat. No. 4,808,561, however, discloses that optimum results are obtained when the alumoxane is dissolved in a suitable inert hydrocarbon solvent which is first added to the dehydrated support material and, slurried in the same or other suitable hydrocarbon liquid. The metallocene is added to the slurry thereafter. The prior art methods described above for producing supported catalysts systems have concentrated on (1) varying treatments of the support or carrier or (2) varying the manner of addition of the catalyst onto the support.

While not wishing to be bound by theory, the Inventors believe that the low catalytic activity and reactor wall fouling, which occurs during polymerization, is due to several factors. First, residual solvent remains in the pores of the support material employed at the stage after placement of the catalyst onto the carrier. The residual solvent prevents the catalyst system from securely anchoring itself onto the carrier or into the pores of the carrier. Thus when the supported catalyst is added to the reaction polymerization vessel, the catalyst disassociates from the support, and migrates to the reactor walls where monomer can polymerize therefrom and cause fouling. Secondly, when methyl alumoxane (MAO) is used as cocatalyst in the polymerization at temperatures about or greater than 40° C., the MAO dissolves and extracts the metallocene catalyst from the support and forms a soluble catalyst in the polymerization medium. This soluble catalyst easily deposits polymer onto the reactor walls and/or generates very small particles of low bulk density which are undesirable in a commercial reactor.

Although little has been written regarding commercially marketable catalyst, those skilled in the art are aware that stability, storage and use of transportation of a supported catalyst are major concerns with regard to a commercially marketable catalyst. Vendors prefer catalysts with catalytic stability of about 6 months or more. Few is any catalyst systems are known which when placed on a support address these commercial needs.

The art, as yet, lacks a method to address these problems raised by the prior art techniques for supporting and maintaining a catalyst with high activity, and stability, and yet reduce fouling to commercially acceptable levels during the polymerization reactor process.

SUMMARY OF THE INVENTION

The present invention relates to a novel process for producing a supported metallocene catalyst system having high catalytic activity, low reactor fouling and stability for periods of at least 6–12 months or more, when stored under inert atmospheric conditions. The heterogeneous catalyst is useful for the production of polyolefins having controlled particle size and narrow molecular weight distribution. The polyolefin produced from these catalysts can be obtained as free flowing polymer and in granular or in powder form. Generally, a granular polymer is obtained when the supported catalyst (un-or pre-polymerized) is employed with TEAL as cocatalyst; a powdery polymer is obtained when the supported catalyst (unprepolymerized) is employed with MAO. There are minimal or no signs of reactor fouling observed during polymerization when the inventive process to produce the supported catalyst is followed and thus has significant commercial utility.

The general process described hereinbelow to prepare a supported catalyst can be applied to any single or mixed metallocene system. Typically the metallocene is activated with MAO to form a reaction product which is subsequently contacted with dehydrated silica, and supported on the silica through drying. This forms the supported catalyst product. It is important that the supported catalyst product be thoroughly dried before subsequent use. The catalyst product may optionally be prepolymerized with an olefin to impart improved catalyst particle strength. During the polymerization process, a trialkylaluminum or organoaluminum co-catalyst or scavenger is employed to minimize or eliminate reactor fouling and increase catalytic activity. Depending upon polymerization temperatures, one chooses a trialkyl versus an organoaluminum co-catalyst in the process.

The supported catalyst produced by the novel process has been found to maintain catalyst activity in the range of about 50% to 90% for greater than one year. The catalyst can be employed in the polymerization of one or more olefins or alpha olefins containing from about 2 to about 20 carbon atoms, to produce homo- and/or co-polymers, but is especially useful in the production of iso- or syndiotactic polypropylene, ethylene-propylene copolymer, and polyethylene and ethylene higher alpha olefin copolymers.

DETAILED DESCRIPTION OF THE INVENTION

The invention relates to a novel process for producing a supported metallocene catalyst system useful for the polymerization and/or copolymerization of olefins, alpha-olefins, and/or di olefins which results in a catalyst product which during polymerization, produces minimal to no reactor fouling and polymer of controlled morphology. The invention is particularly useful, but not limited, for polymerizing propylene or copolymerizing propylene with olefins having two or more carbon atoms. The novel support technique described herein results in a catalyst which will obtain polymer product having controlled, uniform particle size, narrow molecular weight distribution, high bulk density and depending upon the metallocene employed and monomers polymerized, stereoregularity.

The present invention employs at least one catalyst component in the formation of the supported catalyst system. The catalyst component to be employed may be a metallocene, or non-metallocene moiety, as defined previously. Exemplary catalysts such as those described in the following patents may be usefully employed in the present invention: U.S. Pat. Nos. 5,017,714, 5,055,436, and EPA 129,368.

The present invention is intended to serve as a general mechanism for supporting any type of catalyst system whether it be a metallocene or non metallocene based system. It is believed that any type of catalyst and suitable cocatalyst system which is currently known or to be developed can be supported on an inert support media utilizing the disclosed technique and maintain high catalytic activity during polymerization, and stability during storage, yet result in a polymerization process without reactor fouling. Although much is published regarding supported technology, the instant invention involves a unique combination of steps, i.e., (1) forming the metallocene/alumoxane reaction solution, (2) adding dehydrated carrier (3) evaporating or heating the resulting slurry to remove liquid solvent (4) further heat to desolvate the solid supported catalyst and thus remove any residual solvent trapped in the pores prior to use. A fifth (5) optional step involves prepolymerizing the catalyst with olefinic monomer. To obtain a polymer product in the absence of reactor fouling, the supported catalyst (as is or prepolymerized) is utilized with a cocatalyst or scavenger aluminum alkyl or organoaluminum during polymerization. The additional steps to ensure loss of all moisture and solvent are important for production of the supported catalyst.

The transition metal containing catalyst of the present invention is obtained by reacting, in a suitable solvent such as toluene, an organoaluminum compound, typically methyl alumoxane, and a metallocene to form a reaction product solution, which is then contacted with the dehydrated support material. The supported reaction product is isolated, and dried to remove residual solvent. The supported catalyst product formed can be employed as a sole catalyst component for the polymerization of olefins containing from about 2 to about 20 carbon atoms, or, in the preferred alternative, it can be employed with an organometallic cocatalyst such as triethylaluminum or MAO. It is preferred to employ a cocatalyst or scavenger during polymerization since enhanced catalyst activity and reduced reactor fouling is observed.

Typically the support can be any organic or inorganic, inert solid, particularly, porous supports such as talc, inorganic oxides, and resinous support materials such as polyolefin. Suitable inorganic oxide materials which are desirably employed include Groups 2, 3, 4 or metal oxides such as silica, alumina, silica-alumina, and mixtures thereof. Other inorganic oxides that may be employed either alone of in combination with the silica, alumina or silica-alumina are magnesia, titania, zirconia, and the like. Other suitable support materials can be employed such as, finely divided polyolefins, such as polyethylene.

It is important to the instant invention that prior to use, the carrier be thoroughly dehydrated, preferably to contain about or less than 1% loss on ignition (LOI). Thermal dehydration treatment may be carried out in vacuum or while purging with a dry inert gas such as nitrogen at a temperature of about 100° C. to about 1000° C., and preferably, from about 300° C. to about 800° C. Pressure considerations are not critical. The duration of thermal treatment can be from about 1 to about 24 hours. However, shorter or longer times can be employed provided equilibrium is established with the surface hydroxyl groups.

Dehydration can also be accomplished by subjecting the carrier to a chemical treatment in order to remove water and reduce the concentration of surface hydroxyl groups. Chemical treatment converts all water and hydroxyl groups in the oxide surface to inert species. Useful chemical agents are for example, chlorosilanes such as $SiCl_4$, trimethylchlorosilane, dimethylaminotrimethylsilane and the like. The chemical dehydration is accomplished by slurrying the inorganic particulate material such as, for example silica, in an inert low boiling hydrocarbon, such as for example, hexane. During the chemical dehydration treatment, the silica should be maintained in a moisture and oxygen free atmosphere. To the silica slurry is then added a low boiling inert hydrocarbon solution of the chemical dehydrating agent, such as, for example dichloroldimethylsilane. The solution is added slowly to the slurry. The temperature ranges during chemical dehydration reaction can be from about 25° C. to about 120° C., however, higher and lower temperatures can be employed. Preferably, the temperature will be about 50° C. to about 70° C. The chemical dehydration procedure should be allowed to proceed until all the moisture is removed from the particulate support material as indicated by cessation of gas evolution. Normally, the chemical dehydration reaction will be allowed to proceed from about 30 minutes to about 16 hours, preferably, 1 to 5 hours. Upon completion of the chemical dehydration, the solid particulate material is filtered under a nitrogen atmosphere and washed one or more times with a dry, oxygen free inert solvent. The wash solvents as well as the diluents employed to form the slurry and the solution of chemical dehydrating agent, can be any suitable inert hydrocarbon. Illustrative of such hydrocarbons are heptane, hexane, toluene, isopentane and the like.

The specific particle size of the support or inorganic oxide, surface area, pore volume, and number of hydroxyl groups is not critical to its utility in the practice of this invention. However, such characteristics determine the amount of support to be employed in preparing the catalyst compositions, as well as affecting the properties of polymers formed. The characteristics of the carrier or support must therefore be taken into consideration in choosing the same for use in the particular invention.

The normally hydrocarbon soluble metallocenes and linear or cyclic alumoxanes are converted to a heterogeneous supported catalyst by depositing the reaction product of metallocene and alumoxane on the thermally or chemically dehydrated supported material. The contacting of the metallocene and alumoxane to form a reaction product and the subsequent contacting with the supporting material, is conducted in an inert solvent. The same inert solvent or a different solvent is also employed to dissolve the metallocene(s) and alumoxane. Preferred solvents include mineral oils and the various hydrocarbons which are liquid at reaction temperatures and in which the individual ingredients are soluble. Illustrative examples of useful solvents include the alkanes such as pentane, isopentane, hexane, heptane, octane, and nonane; cycloalkanes such as cyclopentane and cyclohexane; and aromatics such as benzene, toluene, ethylbenzene, and diethylbenzene.

The amount of alumoxane and metallocene usefully employed in preparation of the supported catalyst system can vary over a wide range. However, an aluminum to transition metal molar ratio of about 12:1 to about 500:1 is preferred; more preferably, a ratio of about 50 to 400 is employed. The weight ratio of metallocene to support is 0.01 to 0.20, most preferably 0.05 to 0.10.

The metallocene(s) and alumoxane are dissolved in toluene to form a reaction product in solution. The amount of solvent to be employed is not critical. Never the less, the amount should be employed so as to dissolve the reaction product, provide adequate heat transfer away from the catalyst components during the reaction and to permit good mixing. Preferably the metallocene solution is added to the alumoxane solution and reacted at room temperature. The reaction between the alumoxane and the metallocene is rapid and it is desired that they are contacted for about one minute to one hour, preferably ten minutes. The reaction of the alumoxane and the metallocene is evidenced by its exothermic nature and a color change. However, the exotherm or color changes are not required and other analytical techniques may be employed to monitor completion of the reaction.

The supported catalyst of this invention is prepared by adding the previously dehydrated carrier, typically silica, in dry form or as a slurry in the same or a different inert solvent to the previously formed reaction product solution. Preferably the silica is added dry. The ingredients can be added to the reaction vessel rapidly or slowly. The temperature maintained during contact of the metallocene/alumoxane solution and carrier can vary widely, such as, for example, from 0° C. to 100° C. Greater or less temperatures can also be employed. The contacting of the silica with the reaction product solution forms a slurry and is preferably maintained at room temperature for about one minute to one hour, preferably five minutes.

The formed slurry is then heated under vacuum, preferably with a nitrogen flow to aid in removal of the solvent. Heating can be maintained until all the liquid solvent has been removed, typically about one to three hours at a temperature from about 30° C. to about 60° C. When all the liquid solvent has been removed, and the solid is visually dry, the isolated solid is additionally heated from 30° C. to about 80° C. for a time of about one hour to about eight hours, preferably, three hours, or until all of the residual solvent trapped in the porous support material has been removed. At this point the supported catalyst is formed as a free flowing powder.

At all times, the individual ingredients as well as the recovered catalyst component are protected from oxygen and moisture. Therefore, the reactions must be performed in an oxygen and moisture free atmosphere and recovered in an atmosphere which is moisture and oxygen free. Preferably, therefore the reactions are performed in the presence of an inert dry gas such as, for example nitrogen. The recovered catalyst is maintained in a nitrogen atmosphere.

The supported catalyst can be utilized at this stage for the polymerization of olefins, in combination with a cocatalyst or scavenger. Table 2 illustrates results of syndiotactic polypropylene made using the supported, as-is or un-prepolymerized, i-Pr (fluorenyl) (cyclopentadienyl) zirconium dichloride/MAO catalyst system in combination with either triethylaluminum (TEAL) or MAO as a cocatalyst during polymerization. When TEAL is used at polymerization temperatures of about 40° C. or greater, a granular polymer product results with minimal to no reaction fouling being observed. When MAO is used at a polymerization temperature of about 40° C., a polymer with both granular and powder like characteristics results. Although polymerizations of olefins are exemplified at temperatures of about 40° C. and 60° C., any temperatures can be employed.

MAO as a cocatalyst is only recommended for use at polymerization temperatures of about 40° C. or less, otherwise reactor fouling is observed. Comparative examples A and B employed the above catalyst in homogeneous (unsupported) format, resulting in sheets forming on the reactor walls during polymerization at temperatures of about 40° C. and 60° C.

Prepolymerization of the supported catalyst can be employed to strengthen catalyst particles and enhance particle size control of the final polymer formed. The supported catalyst is reslurried in isopentane or a MAO non-solvent and prepolymerized with an olefin monomer, such as ethylene gas. The prepolymerized catalyst is then decanted, washed with isopentane, and dried in a vacuum at room temperature in order to isolate the supported, prepolymerized catalyst. The prepolymerization typically occurs at a temperature of $-15°$ C. to $+30°$ C., preferably less than 25° C. for about 75 minutes. The amount of prepolymer can be varied from 10% to 300% of the supported catalyst weight, most preferably 50–150%.

The polymers made in accordance with this invention are commercially interesting due in part to the low to no fines generated during polymerization; fines which lead to reactor fouling and sheeting and plugged lines and screens in a polymerization reactor. An additional advantage is their ease of storing and transporting.

All examples herein demonstrate the use of a wide variety of metallocenes bridged and unbridged, and a wide variety of polymer types, such as isotactic PP, syndiotactic PP, Polyethylene, and ethylene-propylene copolymers. The advantages of the instant invention, described herein, make this invention extremely valuable. The inventive process provides a means of converting any metallocene into a supported catalyst capable of operating in any polyolefin polymerization reactor with little modification and without operational process related problems. The inventors are not away of any known techniques which have exemplified such a wide range of metallocenes for making a wide range of polymer types in a reactor with little to not reactor fouling occurring.

Experiments we carried out in nitrogen purged dry boxes. All solvents were purchased from commercial sources, nitrogen purged and dried over activated molecular sieves. $ZrCl_4$ was purchased from commercial sources and used as received. Aluminum alkyls were purchased as 20–25 wt % solutions from silica is Davidson 948 dehydrated to 800° C. in a flow of nitrogen for eight hours.

All metallocenes were prepared by published literature procedures and characterized by proton and/or carbon NMR. Polymer analysis was carried out as described in U.S. Pat. Nos. 5,026,798 and 5,017,714. Tacticity measurements were determined by $^{13}C$ NMR as described in "Polymer Sequence Distributions", J. C. Randall, Academic Press, New York, (1986). DSC melting points were determined on commercial DSC instruments and are reported as second melting point.

Polymerization procedure is as follows. In a clean, dry two liter autoclave which has been flushed with propylene, the cocatalyst (TEAL or MAO) was added and then the reactor closed and filled with 800 ml liquid propylene. The reactor was heated to the desired temperature and the catalyst, slurried in mineral oil (12 or 18 wt %), was washed in via an addition tube with 200 ml propylene. After the desired reaction time the reactor was cooled and the excess propylene vented. The polymer was removed and dried.

The present invention is illustrated by the following illustrative but not limiting examples. Results are tabulated in tables 1–3. "Me" means methyl, "Ph" means phenyl, and "Pr" means propyl.

EXAMPLE 1

To an eight liter vessel equipped with a cooling jacket and an efficient overhead stirrer was added Methyl Aluminoxane (MAO, 904 ml, 30 wt %, 4.2 mol Al). With stirring a solution of rac-$Me_2Si$(tetrahydroindenyl)$_2ZrCl_2$ (20.0 g, 0.0438 mol, Al/Zr=96) prepared according to U.S. Pat. No. 5,017,714 in toluene (950 ml) was slowly added over five minutes. After stirring two minutes, dehydrated silica (199.8 g) was added over three minutes. Stirring was continued for four minutes and then the reaction mixture was gradually heated to 48° C. over thirty minutes while vacuum was applied from the top of the vessel. A slight nitrogen purge into the bottom of the vessel assisted in the solvent removal. Ninety minutes later the mixture was very viscous. Heating was increased gradually to 63° C. over the next three hours. At this point the supported catalyst is a dry, free flowing solid which was cooled to ambient temperature. Isopentane (6.4 liter) was added to slurry the solids. This slurry was cooled to $-5°$ C. and ethylene slowly added via a dip tube at a rate of 2 l/minute. This was gradually increased to 3.6 l/minute over eighty minutes as the temperature rose to 16° C. at which time the ethylene flow was stopped. Agitation was stopped, and the prepolymerized catalyst allowed to settle. The liquid phase was decanted and the solids washed twice with isopentane, and transferred to a dry box. The slurry was passed through a sieve (#14), filtered and washed three times with pentane (4 liter). The solids were dried under vacuum at ambient temperature for 3.5 hours to give a light yellow solid (686 g, density=0.407 g/cc).

EXAMPLE 2

To an eight liter vessel equipped with a cooling jacket and an efficient overhead stirrer was added Methyl Aluminoxane (MAO, 904 ml, 30 wt %, 4.2 mol Al). With stirring a solution of $Me_2Si$(tetrahydroindenyl)$_2ZrCl_2$ (10.0 g, 0.0438 mol, Al/Zr=192) in toluene (950 ml) was slowly added. After stirring eight minutes dehydrated silica (200.7 g) was added. Stirring was continued for two minutes and then the reaction mixture was gradually heated to 54° C. over sixty five minutes while vacuum was applied from the top of the vessel. A slight nitrogen purge into the bottom of the vessel assisted in the solvent removal. At this point the mixture was very viscous. Heating was increased gradually to 66° C. over the next three hours. At this point the supported catalyst was a dry, free flowing solid which is cooled to ambient temperature. Pentane (5.1 liter) was added to slurry the solids. This slurry was cooled to −1° C. and ethylene slowly added via a dip tube at a rate of 2.1 l/minute. This was gradually increased to 3.6 l/minute over eighty five minutes as the temperature rose to 15° C. at which time the ethylene flow was stopped. Agitation was stopped, and the prepolymerized catalyst allowed to settle. The liquid phase was decanted and the solids washed three times with isopentane, and transferred to a dry box. The slurry was passed through a sieve (#14), filtered and washed three times with isopentane (2 liter). The solids were dried under vacuum at ambient temperature for 4.25 hours to give a light yellow solid (457 g, 0.532 g/cc).

EXAMPLE 3

To an eight liter vessel equipped with a cooling jacket and an efficient overhead stirrer was added Methyl Aluminoxane (MAO, 452 ml, 30 wt %, 2.1 mol Al). With stirring a solution of $Me_2Si(2\text{-methyl-4-t-butylcyclopentadienyl})_2ZrCl_2$ (3.73 g, 0.00763 mol, Al/Zr=275, approximately 85% rac isomer, prepared according to H. H. Brintzinger, et al., J. Organomet. Chem, 369 (1989) 359-370) in toluene (350) was slowly added over five minutes. After stirring ten minutes, dehydrated silica (100.2 g) was added over ten minutes. Stirring was continued and the reaction mixture was gradually heated to 54° C. over thirty minutes while vacuum was applied from the top of the vessel. A slight nitrogen purge into the bottom of the vessel assisted in the solvent removal. Sixty minutes later the mixture was very viscous. Heating was increased gradually to 68° C. over the next three hours. At this point the supported catalyst was a dry, free flowing solid which was cooled to ambient temperature. Isopentane (6.4 liter) is added to slurry the solids. This slurry was cooled to −2° C. and ethylene slowly added via a dip tube at a rate of 2.1 l/minutes. This was gradually increased to 3.3 l/minute over fifty seven minutes as the temperature rose to 18° C. at which time the ethylene flow was stopped. Agitation was stopped, and the prepolymerized catalyst allowed to settle. The liquid phase was decanted and the solids washed twice with isopentane, and transferred to a dry box. The slurry was passed through a sieve (#14), filtered and washed three times with pentane (3 liter). The solids were dried under vacuum at ambient temperature for 2.5 hours to give a light yellow solid (307 g, 0.201 g/cc).

EXAMPLE 4

To an eight liter vessel equipped with a cooling jacket and an efficient overhead stirrer was added Methyl Aluminoxane (MAO, 525 ml, 30 wt %, 2.4 mol Al). With stirring a solution of $Ph_2C(\text{fluorenyl})(\text{cyclopentadienyl})ZrCl_2$ (7.0 g, 0.0126 mol, Al/Zr=191, prepared according to EPA 387,690) in toluene (700 ml) was slowly added over five minutes. After stirring eight minutes, dehydrated silica (146.1 g) was added over ten minutes. Stirring was continued for seven minutes and then, while vacuum was applied from the top of the vessel, a slight nitrogen purge into the bottom of the vessel assisted in the solvent removal, the reaction mixture was gradually heated to 54° C. over fifty minutes and became very viscous. Heating was increased gradually to 64° C. over the next three hours. At this point the supported catalyst was a dry, free flowing solid which was cooled to ambient temperature overnight. Isopentane (5.5 liter) was added to slurry the solids. This slurry was cooled to 15° C. and ethylene slowly added via a dip tube at a rate of 1.5 l/minute. The addition rate was maintained between 1.0 and 1.5 l/minute over eighty five minutes as the temperature rose to 24° C. at which time the ethylene flow was stopped. Agitation was stopped, and the prepolymerized catalyst allowed to settle. The liquid phase was decanted and the solids washed twice with isopentane, and transferred to a dry box. The slurry was passed through a sieve (#14), filtered and washed three times with pentane (2 liter). The solids were dried under vacuum at ambient temperature for 3.5 hours to give a light purple solid (364 g).

EXAMPLE 5

In a round bottom flask i-Pr(Fluorenyl)(cyclopentadienyl)$ZrCl_2$ (0.025 g, 0.058 mmol, made by the procedure of Ewen, et al. J. Amer. Chem. Soc. 110,6255 (1988) was slurried in toluene (3.5 ml) and stirred fifteen minutes. To this orange slurry MAO (7.5 mls, 9.5 wt % MAO in toluene) was slowly added to give a deep purple solution. After fifteen minutes, silica (0.5 g) was added and stirring continued twenty minutes. The reaction mixture was heated to 65° C. under vacuum for 75 minutes. The dried solid was washed twice with pentane (14 mls total), filtered and dried under high vacuum giving a purple solid (0.76 g).

EXAMPLE 6

In a round bottom flask i-Pr(Fluorenyl)(cyclopentadienyl)$ZrCl_2$ (0.025 g, 0.058 mmol) was slurried in toluene (3.5 ml) and stirred. To this orange slurry MAO (5.3 mls, 9.5 wt % MAO in toluene) was slowly added to give a deep purple solution. After fifteen minutes silica (0.5 g) was added. After 16 hours the reaction mixture was heated to 45° C. under vacuum. After 15 minutes the solids were visually dry. Drying was continued for 1.75 hours. The dried solid was washed twice with pentane (13 mls total), filtered and dried under high vacuum 1.75 hours giving a purple solid (0.60 g).

EXAMPLE 7

Example 6 was repeated, except the MAO amount was 2.7 mls and the isolated yield was 0.54 g.

EXAMPLE 8

Example 6 was repeated except the metallocene solution was added to the MAO solution. The solid was visually dry in 30 minutes and the isolated yield was 0.67 g.

EXAMPLE 9

To an eight liter vessel equipped with a cooling jacket and an efficient overhead stirrer was added Methyl Aluminoxane (MAO, 905 ml, 31 wt %, 4.2 mol Al). With stirring a solution of $Me_2Si(\text{tetrahydroindenyl})_2ZrCl_2$ (10.0 g, 0.0219 mol, Al/Zr=192, (prepared according to U.S. Pat. No. 5,017,714)in toluene (700 ml) was slowly added over three minutes. One minute later, dehydrated silica (200 g) was added over three minutes. Stirring was continued for one minute and then the reaction mixture was gradually heated to 52° C. over thirty minutes while vacuum was applied from the top of the vessel. A slight nitrogen purge into the bottom of the vessel assisted in the solvent removal. Thirty minutes later the mixture was very viscous. Heating was increased gradually to 66° C. over the next three hours. At this point the supported catalyst was a dry, free flowing solid which was cooled to ambient temperature. Isopentane (6.2 liter) was added to slurry the solids. This slurry was cooled to 15° C. and ethylene slowly added via a dip tube at a rate of 3.3 l/minute which was maintained over 55 minutes as the temperature rose to 20° C. at which time the ethylene flow was stopped. Agitation was stopped, and the prepolymerized catalyst allowed to settle. The liquid phase was decanted and the solids washed three times with isopentane, and transferred to a dry box. The slurry was passed through a sieve (#14), filtered and washed three times with pentane (3 liter). The solids were dried under vacuum at ambient temperature for four hours to give a light yellow solid (551 g, density=0.442 g/cc).

An ethylene polymerization was carried out by placing hexane (400 mls) into a dry, one liter autoclave equipped with an overhead stirrer. TEAL (0.8 ml, 1.5M) was added, and the reactor heated to 60° C. When the temperature stabilized the solid catalyst prepared above (0.345 g) was injected with hexane (100 mls) and ethylene was added continuously to maintain a reactor pressure of 180 psig. After one hour the reactor was depressurized, and the polyethylene/hexane slurry removed. Evaporation of the hexane gave 27.9 g polyethylene granules with bulk density=0.307 g/cc.

| | |
|---|---|
| Catalyst Efficiency: | 0.08 Kg/g/hr |
| Molecular weight (Mw × $10^{-3}$): | 281 |
| MWD | 3.4 |
| Density | 0.9479 g/cc |
| MI | <0.12 |

EXAMPLE 10

To an eight liter vessel equipped with a cooling jacket and an efficient overhead stirrer was added Methyl Aluminoxane (MAO, 2950 ml, 10 wt %, 4.8 mol Al). With stirring a solution of bisindenylzirconiumdichloride (5.0 g, 0.0123 mol, Al/Zr=390, prepared according to commonly known literature procedures utilizing indenyl lithium and $ZrCl_4$) in toluene (700 ml) was slowly added over seven minutes. After stirring five minutes dehydrated silica (199.5 g) was added over four minutes. Stirring was continued for two minutes and then the reaction mixture was gradually heated to 58° C. over ninety minutes while vacuum was applied from the top of the vessel. A slight nitrogen purge into the bottom of the vessel assisted in the solvent removal. Fifty five minutes later the mixture was very viscous. Heating was increased gradually to 64° C. over the next three hours. At this point the supported catalyst is a dry, free flowing solid which is cooled to ambient temperature. Isopentane (6.4 liter) is added to slurry the solids. This slurry was cooled to 6° C. and ethylene slowly added via a dip tube at a rate of 5.7 l/minute. This was maintained over fourty minutes as the temperature rose to 24° C. The flow was reduced to 3.3 l/minute for twenty five minutes at which time the ethylene flow was stopped. Agitation was stopped, and the prepolymerized catalyst allowed to settle. The liquid phase was decanted and the solids washed five times with isopentane, and transferred to a dry box. The slurry was passed through a sieve (#14), filtered and washed three times with pentane (4 liter). The solids were dried under vacuum at ambient temperature for 2.6 hours to give a light yellow solid (772 g).

Ethylenepropylene (EP) copolymer was produced by using the method outlined in the experimental section above, except that hydrogen (0.16 mmol) was added after the TEAL, polymerization run temperature was maintained at 32° C., ethylene was added continuously to increase total reactor pressure by 275 psi before catalyst addition, and the run time was 15 minutes. A yield of 143.9 g EP copolymer granules with bulk density=0.398 g/cc was obtained. Catalyst Efficiency: 2.88Kg/g/hr, polymer composition: 66.4 wt % ethylene, Mw=398,000, MWD=2.90, and Mooney Viscosity (ML1+4, 125)=106.

We claim:

1. A method to produce a supported metallocene/alumoxane catalyst system comprising the steps of:
   (a) forming a metallocene/alumoxane reaction solution;
   (b) adding a porous carrier
   (c) evaporating the resulting slurry so as to remove residual solvent from the carrier; and
   (d) optionally prepolymerizing the catalyst with olefinic monomer.

2. The method according to claim 1 wherein olefinic monomer(s) are alpha olefins containing from about 2 to about 20 carbon atoms.

3. The method according to claim 1 wherein the metallocene component is a bis cyclopentadienyl derivative.

4. The method according to claim 1 wherein the metallocene is rac $Me_2Si$(tetrahydroindenyl)$ZrCl_2$.

5. The method according to claim 1 wherein the metallocene is rac-$Me_2Si$(2-methyl-4-t-butylcyclopentadienyl)$_2ZrCl_2$.

6. The method according to claim 1 wherein the metallocene is $Ph_2C$(fluorenyl)(cyclopentadienyl)$ZrCl_2$.

7. The method according to claim 1 wherein the metallocene is i-Pr(fluorenyl)(cyclopentadienyl)$ZrCl_2$.

* * * * *

UNITED STATES PATENT AND TRADEMARK OFFICE
CERTIFICATE OF CORRECTION

PATENT NO. : 5,240,894
DATED : August 31, 1993
INVENTOR(S) : Burkhardt et al

It is certified that error appears in the above-indentified patent and that said Letters Patent is hereby corrected as shown below:

Col. 3, line 5: After "use", please delete "of" and substitute in its place --or--.

Col 7, lines 10-15: Please delete everything beginning with "Table 2" and ending with "polymerization."

Col. 7, line 28: Please delete "A and B" and "the above".

Col 7, lines 51-55: Please delete everything beginning with "All examples" and ending with "copolymers."

Col 7, line 61: Please delete "away" and substitute in its place --aware--.

Col 7, line 64: Please delete "not" and substitute in its place --no--.

Col 7, line 66: Please delete "we" and substitute in its place --were--.

Col 8, line 26: Please delete "Results are tabulated in tables 1-3."

Signed and Sealed this

Thirteenth Day of September, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,240,894

DATED : August 31, 1993

INVENTOR(S) : Terry J. Burkhardt, Masahide Murata, William B. Brandley

It is certified that error appears in the above-indentified patent and that said Letters Patent is hereby corrected as shown below:

Column 4, line 21, delete "5,055,436" and substitute in its place --5,055,438 --.

Signed and Sealed this

Twenty-ninth Day of November, 1994

Attest:

BRUCE LEHMAN

Attesting Officer     Commissioner of Patents and Trademarks